Figure 1:
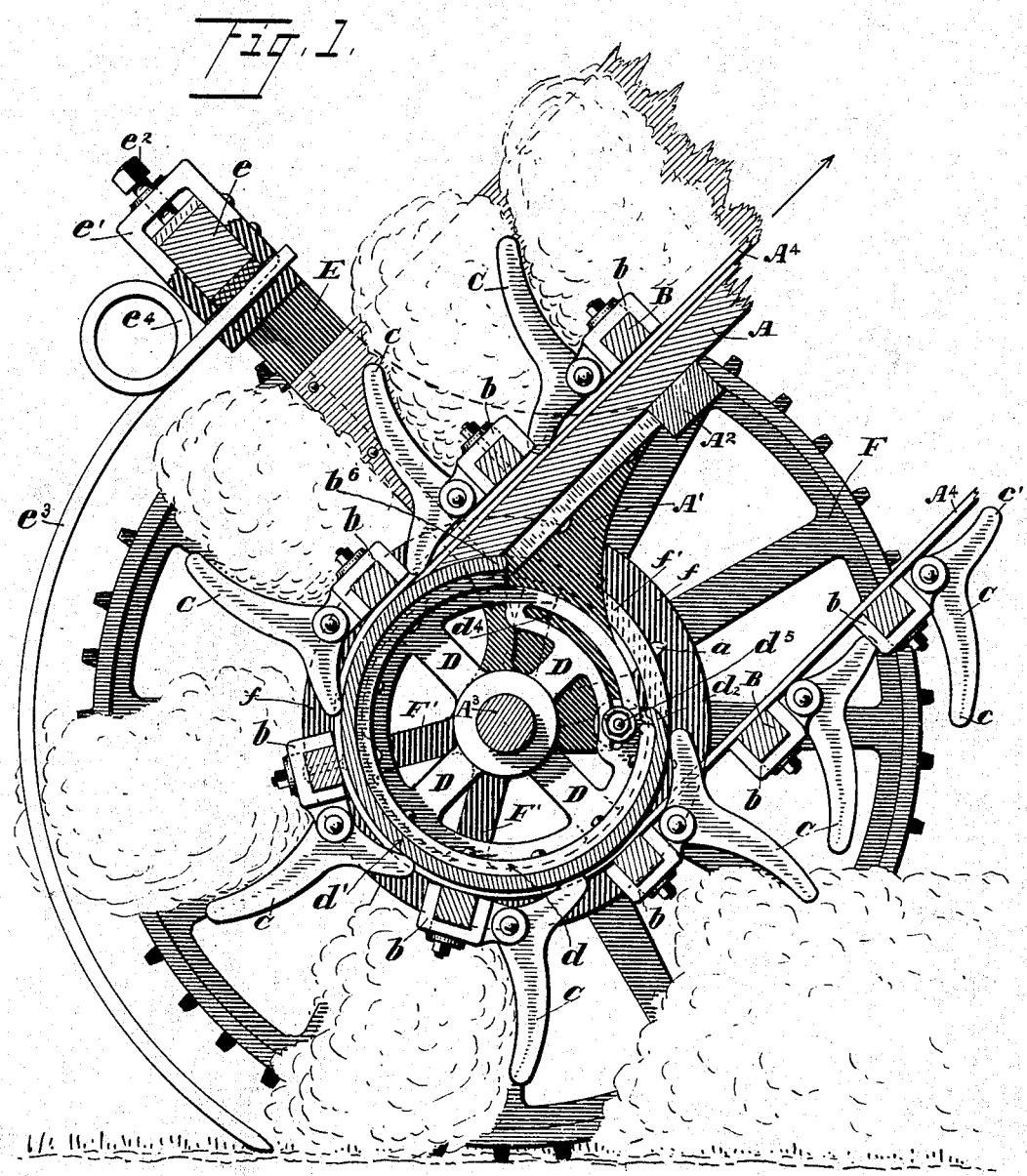

No. 867,995. PATENTED OCT. 15, 1907.
J. D. MUSSER.
CONVEYING DEVICE.
APPLICATION FILED SEPT. 17, 1906.

2 SHEETS—SHEET 1.

Witnesses
Frank W Amstutz
F. J. Trezise

Inventor
John D. Musser
By N. S. Amstutz
Attorney

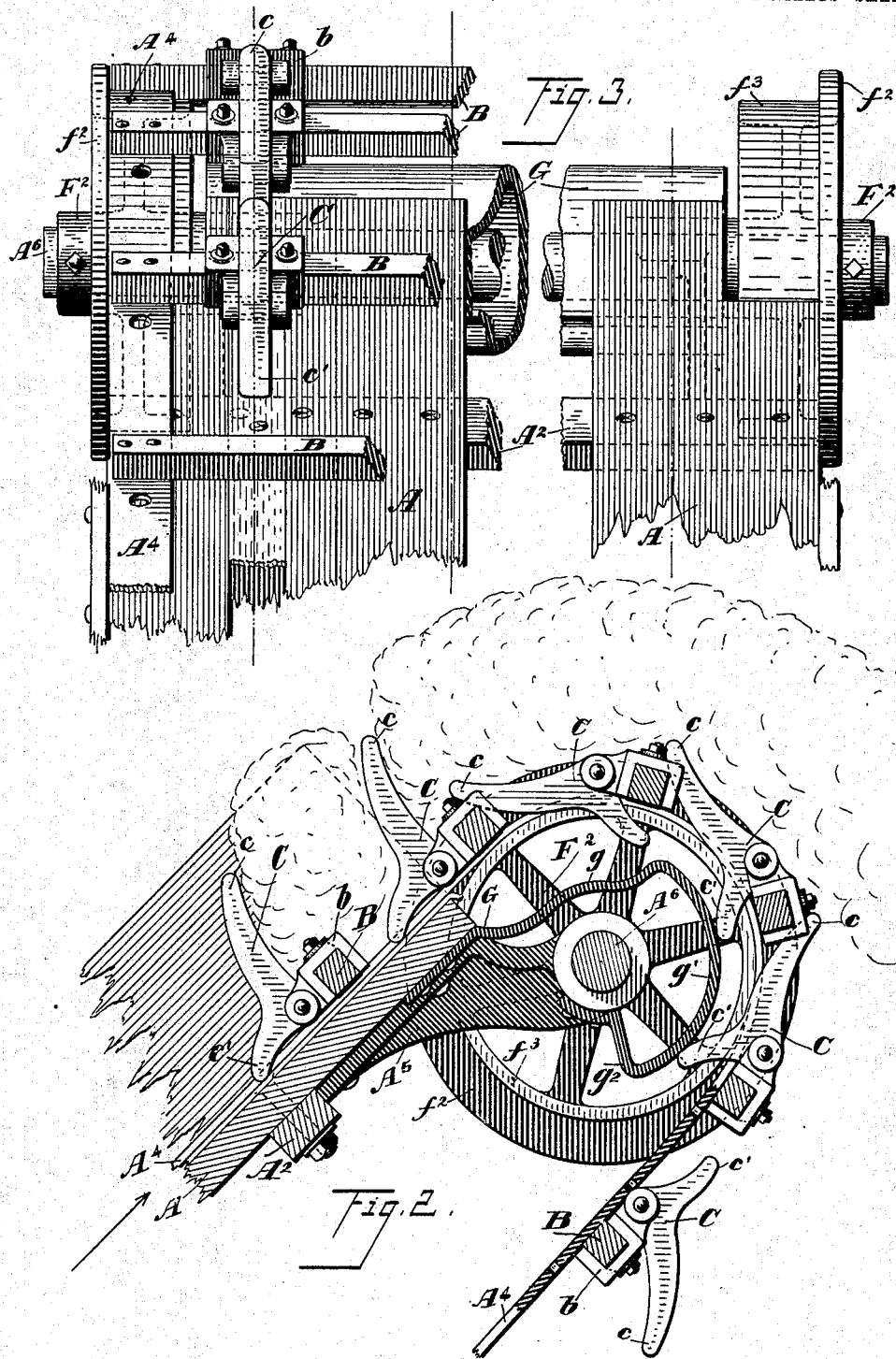

UNITED STATES PATENT OFFICE.

JOHN D. MUSSER, OF EASTON, OHIO.

CONVEYING DEVICE.

No. 867,995.     Specification of Letters Patent.     Patented Oct. 15, 1907.

Application filed September 17, 1906. Serial No. 334,985.

*To all whom it may concern:*

Be it known that I, JOHN D. MUSSER, a citizen of the United States, residing at Easton, in the county of Wayne and State of Ohio, have invented a new and useful Conveying Device, of which the following is a specification.

My invention relates to improvements in conveying mechanisms or devices and it consists of the adaptations shown in the accompanying drawings and the features specifically set forth in the annexed claims.

The purpose of my invention is to produce a conveying device that shall be positive in action, not liable to clogging and one that is adjustable as to the time its members are in action. It is immaterial to what specific use the device is applied. In the drawings it is shown as used on a hay loader, but its cardinal features are equally applicable to threshing machine beaters, in which case the slats or bars to which the pivoted hooks are secured are fastened to a skeleton cylinder instead of the belts as shown in the instance used, applied to hay loaders.

In the accompanying drawings I show an adaptation of the features of my device to hay loaders or kindred devices.

Figure 1 is an elevation partly in section of the driving portion of such an adaptation, showing the adjustable means employed for bringing the hooks into action. Fig. 2 is a side view of the upper end of the loader showing the means used for throwing the hooks out of action, which means may be adjustable if desired, though they are shown as attached solidly to the shaft bearings. Fig. 3 illustrates a front elevation of Fig. 2 with parts broken out and removed.

In the instance shown, the conveying hooks, C, are pivoted to supports, $b$, which are removably secured to the cross bars or slats, B, and these bars are fastened to two endless belts or chains $A^4$, which travel in unison over the rounded "sprocket" pins, $a$, projecting from the two driving wheels, F'—one at each end of the shaft, $A^3$, engaging suitably placed holes formed in the belts, $A^4$. The belts, $A^4$, with the attached bars, B, and hooks, C slide on a series of boards, A, forming, with the side frames, an inclined trough held together by cross pieces, $A^2$ The trough at its lower end is supported on the driving shaft, $A^3$, by means of brackets, A', that are placed immediately inside of the wheels, F', on the shaft, $A^3$; at its upper end it supports brackets, $A^5$, which in turn form bearings for the idler shaft, $A^6$, this shaft has attached at each end wheels, $F^2$, or sprocket wheels, that have ribs, $f^2$, and rims, $f^3$, on which the belts, $A^4$, traverse; the wheels, F', at the bottom end, also have ribs $f'$, and rims, $f$, similar to those at the upper end. The inclined trough is suitably held at the proper inclination by any convenient connection that will hold it in operative relation to a wagon upon which the hay is to be loaded, in the usual manner.

As the wagon is drawn by the horses the hay loader obviously follows and the spudded drive wheels, F, rotate the axle, $A^3$, and thereby set into motion the conveying hooks, C, and belts, $A^4$, and slats, B.

A suitable bracket, E, extends upward from, A', at each end of the shaft, $A^3$, and a bar, $e$, joins them together. On this bar are placed a series of clamps, $e'$, which hold teeth, $e^3$, by means of set screws, $e^2$; these teeth are made elastic by coils, $e^4$, formed thereon the teeth themselves terminate near the ground so as to rake together the hay as the loader and wagon are drawn along. The entire set of teeth may be arranged to be lifted out of action in any suitable manner. The loader may be drawn along a row of hay that has been previously gathered by the well known side delivery hay rake or the loader may be used directly over the hay as mowed, when dry.

In order that the "timing" of the hooks may be controlled at the bottom end of the hay loader there are provided two heads, D, which are loose on the shaft, $A^3$, but are joined together by the circular tripping plate, $d'$, which is riveted to the heads, D, through the projecting flanges, $d$. This "tripping" mechanism is adjustable around the axle, $A^3$, by means of bolts, $d^5$, which project through slots, $d^4$, from brackets, A'. The end, $d^2$, of the curved tripping plate, $d'$, is specially bent inwards so that the toes, $c'$, of the hooks, C, will gradually engage the plate and thus bring their hook ends, $c$, into action without jar or jolt. The ending edge, $b^6$, may be similarly formed.

At the upper end of the loader the hooks are controlled by a tripping plate, G, which is cam shaped at, $g$, so as to allow the hook ends, $c$, to fall backward and pass in under the hay; they are held in this position by the projection, $g'$, which ends at, $g^2$. This insures that the hay shall not be drawn downward again. If it is desired to protect the wood from the wear of the toe-portion, $c'$, of the hooks, C, rubbing against its upper surface, narrow metal strips may be set into the boards so as to permit the hooks to slide thereon.

The adjustable feature shown in Fig. 1. which controls the time when the hooks come into action is an important feature, especially when the invention is used in threshing machines as a beater, in which case the hooks, C, and the slats, B, would travel concentrically around the axle, $A^3$, (slats, B, fastened to the wheels, F') the movement of the hooks being controlled by the curved tripping plate, as described; the point where the toes, $c'$, would leave the plate, $d'$, and throw the hooks out of action being determined by point, $b^6$, where the plate ends; as the plate and heads, D, are adjusted on the axle by means of bolts, $d^5$ the commencing and ending of the hook action is controlled as desired. When used as a threshing machine beater a suitable casing is formed around the shaft, $A^3$, and hooks, C, so as to confine the straw within desired channels. The straw can be made to pass "over" or "under" by reversing the direction of rotation of the shaft, A³, and also reversing the hooks and brackets on slats or bars, B. There are usually used five or six hooks, more or less, to a single bar and the size of the respective parts as shown is not to be taken as a limitation as to their proportion whatsoever.

What I claim, is,

1. In conveying mechanisms, a series of hooks, and means for moving them into collective action, in combination with adjustable means for controlling the duration of their individual activity.

2. In conveying mechanisms, a series of hooks, means for continuously moving them in collective action, in combination with other means adapted to differentially control their periods of individual activity.

3. In conveying mechanisms, a series of hooks and means for continuously moving the entire series into collective action, in combination with adjustable means adapted to differentially throw certain of said hooks out of, or into, individual action.

4. In conveying mechanisms, a series of bars, groups of pivoted hooks secured to each bar, means for collectively moving said bars in unison and means in combination for differentially controlling the action of a group of hooks of one bar independently of other groups.

5. In conveying mechanisms, a series of movable hooks, means for continuously presenting them to the work to be done and means adapted to confine the material being handled within desired limits, in combination with adjustable means adapted to differentially control their period of activity.

In testimony whereof I have signed my name to this specification in the presence of two witnesses.

JOHN D. MUSSER.

Witnesses:
THOS. W. ORR,
HENRY JACOT.